(12) United States Patent
Adam et al.

(10) Patent No.: US 11,542,408 B2
(45) Date of Patent: Jan. 3, 2023

(54) SOLID FILM LUBRICANT, METHOD FOR PRODUCING SAME, SLIDING ELEMENT COMPRISING SAME AND USE THEREOF

(71) Applicant: FEDERAL-MOGUL WIESBADEN GMBH, Wiesbaden (DE)

(72) Inventors: Achim Adam, Nauheim (DE); Joachim Schluter, Wiesbaden (DE)

(73) Assignee: Federal-Mogul Wiesbaden GmbH, Wiesbaden (DE)

( * ) Notice: Subject to any disclaimer, the term of this patent is extended or adjusted under 35 U.S.C. 154(b) by 176 days.

(21) Appl. No.: 16/646,706

(22) PCT Filed: Sep. 7, 2018

(86) PCT No.: PCT/EP2018/074103
§ 371 (c)(1),
(2) Date: Mar. 12, 2020

(87) PCT Pub. No.: WO2019/052905
PCT Pub. Date: Mar. 21, 2019

(65) Prior Publication Data
US 2020/0407592 A1    Dec. 31, 2020

(30) Foreign Application Priority Data
Sep. 12, 2017  (DE) .................. 10 2017 216 109.4

(51) Int. Cl.
*C09D 179/08*    (2006.01)
*C09D 5/00*    (2006.01)
(Continued)

(52) U.S. Cl.
CPC ............ *C09D 179/08* (2013.01); *C09D 5/00* (2013.01); *C10M 107/44* (2013.01);
(Continued)

(58) Field of Classification Search
CPC ................. C10M 169/04; C10M 107/44; C10M 177/00; C10M 2201/041;
(Continued)

(56) References Cited

U.S. PATENT DOCUMENTS 3,179,631 A    4/1965   Endrey
3,718,447 A *  2/1973   Hibbs, Jr. ................ B24D 3/28
                                                              51/295

(Continued)

FOREIGN PATENT DOCUMENTS

CN    1080647 A    1/1994
CN    1442469 A    9/2003
(Continued)

OTHER PUBLICATIONS

International Search Report, dated Dec. 21, 2018 (PCT/EP2018/074103).

*Primary Examiner* — Vishal V Vasisth
(74) *Attorney, Agent, or Firm* — Robert L. Stearns; Dickinson Wright, PLLC (57) ABSTRACT

The invention relates to an imide polymer-based solid film lubricant, a method for producing same, a sliding element comprising same and the use thereof. According to the method, difunctional or cyclized difunctional compounds and optionally functional fillers are added to a non-imidized or partly imidized polyamide acid prepolymer or an imidized short-chain blocked prepolymer in a solvent or solvent mixture and then, depending on the prepolymer, a polymerization reaction or an imidization reaction and in both cases a crosslinking reaction is carried out. The solid film lubricant comprises an imide polymer as the resin matrix and optionally functional fillers, the molecules of the imide polymer comprising groups ($R_1$) of the difunctional compounds that additionally contribute to the crosslinking.

27 Claims, 1 Drawing Sheet

(51) Int. Cl.
*C10M 107/44* (2006.01)
*C10M 169/04* (2006.01)
*F16C 33/10* (2006.01)
*F16C 33/20* (2006.01)
*C10N 50/00* (2006.01)
*C10N 30/06* (2006.01)

(52) U.S. Cl.
CPC ....... *C10M 169/04* (2013.01); *F16C 33/1095* (2013.01); *F16C 33/201* (2013.01); *F16C 33/203* (2013.01); *C10M 2201/041* (2013.01); *C10M 2201/05* (2013.01); *C10M 2201/061* (2013.01); *C10M 2201/062* (2013.01); *C10M 2201/066* (2013.01); *C10M 2201/102* (2013.01); *C10M 2213/062* (2013.01); *C10N 2030/06* (2013.01); *C10N 2050/025* (2020.05)

(58) Field of Classification Search
CPC .... C10M 2217/0443; C10M 2201/065; C10M 2201/066; C10M 2201/061; C10M 2213/062; C10M 2201/062; C10M 2201/05; C10M 2201/102; F16C 33/1095; F16C 33/201; F16C 33/203; F16C 2240/48; F16C 2240/60; F16J 1/02; F16J 9/26; C09D 5/00; C09D 179/08; F02F 3/00; C10N 2050/025; C10N 2030/06; C10N 2050/02
See application file for complete search history.

(56) References Cited

U.S. PATENT DOCUMENTS

| | | |
|---|---|---|
| 4,107,125 A | 8/1978 | Lovejoy |
| 6,214,923 B1 | 4/2001 | Goto et al. |
| 2002/0037400 A1 | 3/2002 | Fujiwara et al. |
| 2002/0192490 A1 | 12/2002 | Kanayama et al. |
| 2005/0257861 A1 | 11/2005 | Raos |
| 2007/0082825 A1 | 4/2007 | Kawakami et al. |
| 2011/0268944 A1* | 11/2011 | Adam ........................ F16J 9/26 428/216 |
| 2012/0065296 A1 | 3/2012 | Fujimoto et al. |
| 2015/0184694 A1 | 7/2015 | Mekhilef et al. |
| 2017/0081522 A1 | 3/2017 | Adam et al. |
| 2017/0350448 A1 | 12/2017 | Leonardelli |

FOREIGN PATENT DOCUMENTS

| | | |
|---|---|---|
| CN | 107001630 A | 8/2017 |
| DE | 1198547 B | 8/1965 |
| DE | 2729825 C2 | 2/1980 |
| EP | 0972805 A2 | 1/2000 |
| EP | 0984182 A1 | 3/2000 |
| EP | 1775487 A2 | 4/2007 |
| EP | 3023456 A1 | 5/2016 |
| JP | H11246823 A | 9/1999 |
| JP | 2000044800 A | 2/2000 |
| JP | 2001347602 A | 12/2001 |
| JP | 2012062355 A | 3/2012 |
| JP | 2012514170 A | 6/2012 |
| JP | 105980722 A | 9/2016 |
| JP | 2017509837 A | 4/2017 |
| WO | 2004002673 A1 | 1/2004 |
| WO | 2015090597 A1 | 6/2015 |

* cited by examiner

SOLID FILM LUBRICANT, METHOD FOR PRODUCING SAME, SLIDING ELEMENT COMPRISING SAME AND USE THEREOF

This application is a 371 of PCT/EP2018/074103, filed Sep. 7, 2018.

BACKGROUND

1. Technical Field

This invention relates generally to sliding elements for engines and the like, and to lacquer coatings used in such sliding elements and to methods of their production.

2. Related Art

Sliding elements in engines in most cases comprise multi-layered materials with specially modified surfaces, which optimise the sliding properties. Generally, the surfaces of sliding bearings are metal layers, for instance, based on lead, tin or aluminium, which are applied by means of galvanic processes, vaporisation or mechanical plating.

Non-metal layers based on synthetic resin are also known, so-called anti-friction lacquers, which are modified in terms of their sliding properties, durability and wear resistance by adding fillers.

Sliding coatings based on synthetic resin have been used for many years as an auxiliary agent to reduce the friction quite generally in mechanical constructions. Generally, there are coated metal, plastics material and rubber components which permanently have to be able to be readily moved without further lubrication. In typical applications, the loads are rather small and the peripheral conditions, such as temperature or media, are non-critical.

Plastics materials comprising cross-linked polyimides in general are known, for example, from DE 27 29 825 C2 or DE 11 98 547 A.

From different patent applications, such as, for example, EP 0 984 182 A1 and the first commercially available plain bearing products, applications in the engine, for example, for the crankshaft bearing, are also already known. There is generally mentioned as a substrate the known range of copper and aluminium alloys, the lacquer matrix comprises polyamideimide (PAI), polyimide (PI), epoxy and phenol resin, polybenzimidazole (PBI) or polyetheretherketone (PEEK). For example, reference may be made to the document EP 1 775 487 A1. In order to improve sliding properties and durability, the matrix plastics material is filled with functional fillers, such as solid lubricants, for example, $MoS_2$, $WS_2$, BN, PTFE, ceramic powders, for example, oxides, nitrides, carbides, silicates, metals, for example, Al, Cu, Ag, W, Ni, Au, see, for example, WO 2004/002673 A1. The application of the layer is carried out by means of spraying or pressing methods and subsequent thermal curing.

Nevertheless, the known coatings have under inadequate lubrication conditions at high speeds a rate of wear, via which the layer becomes completely worn when this state occurs more frequently. This may, particularly with substrate materials with limited sliding properties, which is generally the case with copper-based bearing materials, lead to the complete failure of the bearing as a result of fretting.

SUMMARY

An object of this invention is accordingly to achieve a further reduction of the wear rate of lacquer layers on the basis of imide polymers in critical lubrication states and at high speeds. The polymers referred to here and below as imide polymers are intended to be understood to be polymers whose repeat units contain one or more imide groups.

The method for producing an anti-friction lacquer on the basis of an imide polymer as a resin matrix provides for bi-functional or cyclised bi-functional compounds and optionally functional fillers to be added to a non-imidised or partially imidised polyamide acid prepolymer or an imidised, short-chained blocked prepolymer in a solvent or solvent admixture, and subsequently, in accordance with the prepolymer, a polymerisation or an imidisation and in both cases a cross-linking reaction to be carried out.

Therefore, the object is achieved by adding bi-functional or cyclised bi-functional compounds with cross-linkable functionalities, therefore also referred to below as "cross-linking agents", for lacquer formulation, whereby, in addition to the polymerisation or the imidisation reaction, the proportion of the cross-linking is increased during curing of the lacquer. Whereas a spontaneous cross-linking of the molecules of the prepolymer takes place only randomly and as an auxiliary reaction of the imidisation without any cross-linking agent, the cross-linking agents ensure a selective significant increase of the cross-linking proportion. The additional cross-linking improves the mechanical resistance of the resin matrix and consequently finally the durability and the wear resistance of the lacquer layer, in particular at high speeds and with reduced lubrication or dry-running.

The bi-functional compounds can be described as follows:

R' designates herein an aromatic, aliphatic or aromatic-aliphatic residue; X, Y stand for $-NH_2$, $-NHR"$, $-CONH_2$, $-CONHR"$, $-COOH$, $-COZ$, with Z standing for a halogen and R" standing for an aromatic, aliphatic or aromatic-aliphatic residue, where X and Y may be identical or different herein.

The cyclised bi-functional compounds can be described as follows:

R' also designates an aromatic, aliphatic or aromatic-aliphatic residue herein.

The additional cross-linking is carried out in accordance with the prepolymers used with two different reaction methods which are explained using the example of polyamide-imides (PAI). Two types of PAI lacquer raw materials are in use: those based on polyamide acid prepolymers, produced from the components diamine and trimellitic acid anhydride chloride and those based on diisocyanate and acid anhydride. In the first case, the bi-functional compounds used are capable of reacting during the cross-linking with the amide and acid groups of at least two molecules of the polyamide acid prepolymer responsible for the intramolecular cyclisation (referred to below as "polyamide acid groups" for short) (cross-linking reaction). At the same time, the imidisation reaction takes place. In this case, the cross-linking reaction preferably takes place exclusively via the remaining polyamide acid groups which are not (yet) cyclised to form an imide. In the case of the polymers which are produced from the isocyanate components, short-chained but already imidised prepolymers are initially produced, the complete polymerisation of which is interrupted or blocked by suitable end groups. During the curing, a chain lengthening is then carried out by separating the blocking end groups and the reaction of the short-chained prepolymers with each other ("polymerisation"). Although the polymers which are produced in this manner are already intended to be completely imidised, the effect according to the invention can also be established in them. It is assumed that there may be carried out in the dissolved state transposition reactions with the cross-linking, bi-functional or cyclised bi-functional addition ("cross-linking reaction").

Herein, the "imidisation reaction" and the "cross-linking reaction" in the first case and the "polymerisation" and the "cross-linking reaction" in the second case are referred to collectively as "curing".

The bi-functional compounds suitable therefor are not exclusively but particularly preferably diamines, diamides, dicarboxylic acids, amino acids, acid halides, dialcohols and hydroxy carboxylic acids. Suitable cyclised bi-functional compounds are ones which can be formed therefrom by cyclising, preferably lactones or lactams, but also imides and anhydrides. The bi-functional or cyclised bi-functional compounds may be aromatic, aliphatic or aromatic-aliphatic compounds or compounds which are mixed from both.

The chain lengths in aliphatic diamines, diamides, dicarboxylic acids, amino acids, lactams, lactones, dialcohols and hydroxy carboxylic acids is preferably less than 8 C atoms, particularly preferably less than 5 C atoms; this is because longer chains impair the thermal resistance of the anti-friction lacquer.

Preferably, the quantity of the added bi-functional or cyclised bi-functional compounds is at least 1 mol % in relation to the number of potential imide groups of the polyamide acid prepolymer, or the number of present imide groups of the short-chained blocked prepolymer. In a simplified manner, the potential imide groups of the polyamide acid prepolymer and the present imide groups of the short-chained prepolymer are referred to below as "imide groups of the prepolymer".

Even small quantities of the added bi-functional or cyclised bi-functional compounds from 1 mol % in relation to the number of imide groups of the prepolymer improve the properties of a specific lacquer composition based on PAI. In the case of smaller proportions, no significant improvement can be established. These improved properties include the durability and the wear resistance, particularly at high speeds and with reduced lubrication. The peak durability of the crankshaft bearing was thereby already able to be increased to 120 MPa, values which are otherwise achieved only by aluminium-based sputter layers. The fretting resistance, measured using the survival duration under standardised conditions involving deficient lubrication, was more then tripled with respect to binders which were not additionally cross-linked.

It is presumed that, as a result of the cross-linking additions, deformations are displaced from the plastic range into the resilient range, whereby a portion of the adaptation wear and the abrasive wear proportion can be avoided. Both the loading limit and the wear resistance are thereby increased with a high introduction of energy, for instance, at high speeds or under conditions involving deficient lubrication. The additionally cross-linked layers therefore also bring about a significantly increased operational reliability of the bearings with loads under the loading limit.

Proportions over 35 mol % lead to a more powerful change of the crystallinity of the resin matrix. Therefore, the quantity of the added bi-functional compounds is preferably at a maximum 35 mol % in relation to the number of imide groups of the prepolymer.

Particularly preferably, proportions of the added bi-functional or cyclised bi-functional compounds are from 3 to 25 mol % and very particularly preferably from 5 to 20 mol %.

The amide acid prepolymer and the short-chained blocked prepolymer are preferably selected from the group of prepolymers for producing polyimides (PI), polyamideimides (PAI), polyether imides (PEI) and polyester imides.

Imide polymers which are particularly suitable as a cross-linkable resin matrix for the anti-friction lacquer and which are therefore preferred are PI, PAI, PEI and polyester imides as a result of the high temperature and media resistance thereof.

Typically, the curing, that is to say, in detail the polymerisation or the imidisation and in both cases the cross-linking reaction, is carried out by supplying energy, preferably in the form of heat.

Particularly suitable are highly polar, aprotic solvents, particularly preferably NMP (N-methyl-2-pyrrolidone), NEP (N-ethyl-2-pyrrolidone) or additional homologue substances, DMSO (dimethyl sulphoxide), GBL (γ-butyrolactone), DMF (dimethyl formamide), DMAC (dimethyl acetamide), DMEU (1,3 dimethyl-2-imidazolidinone), DMPU (1,3-dimethyl-3,4,5,6-tetrahydro-2(1H)-pyrimidinone, MI (1-methylimidazole), MEK (methyl ethyl ketone). Currently, additional solvents are being tested for their suitability because the above-mentioned ones have either toxic potential or compromises with regard to the processing properties, such as drying and flow behaviour.

The anti-friction lacquer according to the invention is produced according to a method as described above and accordingly comprises an imide polymer, in particular an imide polymer from the above-mentioned group, as a resin matrix, the molecules of which further have residues of the bi-functional or cyclised bi-functional compounds which contribute to the cross-linking, and optionally functional fillers. Here, the completely cured anti-friction lacquer without any solvent is referred to as the "anti-friction lacquer".

In order to adapt the layer properties of the anti-friction lacquer to the objective in the respective application, said functional fillers are used. They do not participate in the cross-linking reaction and the imidisation reaction of the prepolymers. They are present in a state dispersed as uniformly as possible in the anti-friction lacquer.

The proportion of functional fillers is at a maximum 75% by volume in relation to the cured anti-friction lacquer. Similarly to "anti-friction lacquer", the terms "cured anti-friction lacquer" or "cured anti-friction lacquer layer" or "cross-linked anti-friction lacquer" or "cross-linked anti-friction lacquer layer" are intended herein to refer to the anti-friction lacquer or the layer formed therefrom after the curing without taking into consideration the solvent.

Preferably, the functional fillers optionally contain one or more of the substances solid lubricants, hard materials and substances which improve the thermal conductivity or which influence the cross-linking of the lacquer surface.

The addition of solid lubricants improves the emergency running properties, that is to say, the behaviour in non-hydrodynamic operating states. Hard materials are used as wear improvement substances or for conditioning a shaft and materials which improve the thermal conductivity are used to rapidly transport away friction heat and therefore serve long-term durability.

Preferably, metal sulphides with a layer structure such as $MoS_2$, $WS_2$, $SnS_2$, graphite, hexagonal BN, polytetrafluoroethylene (PTFE) or $ZnS/BaSO_4$ mixtures are used as solid lubricants.

Preferably, nitrides, carbides, borides, oxides, for example, SiC, $Si_3N_4$, $B_4C_3$, cubic BN or $SiO_2$ are used as hard materials.

One or more metal powders, particularly comprising Ag, Pb, Au, Sn, Al, Bi or Cu are contained as materials which improve the thermal conductivity.

The cross-linking and surface properties can be influenced, for example, by very fine-grained fillers, such as, for example, $Fe_2O_3$ or $TiO_2$ or the mixed oxides thereof.

Iron (III) oxide and nickel antimony titanium mixed-phase oxide at a quantity up to 15% by vol., preferably from 1 to 10% by vol., in relation to the cured anti-friction lacquer have been found to be particularly effective additional functional fillers. The entire proportion of functional fillers in the cured anti-friction lacquer is also intended not to exceed 75% by vol. in total with the addition of oxide.

The quantity of these additions is intended to be selected in such a manner that the total volume proportion does not exceed 75% of the cured anti-friction lacquer. In this instance, the volume proportion of the hard materials is advantageously not greater than 10% and that of the metal powder is not greater than 30%.

Larger mechanically resistant material proportions worsen the sliding properties and act in an abrasive manner on the shaft running surface. Larger metal proportions are difficult to disperse and are therefore poor in terms of the processing properties.

The sliding element according to the invention has a metal substrate layer and a coating which is applied thereto and which comprises at least one anti-friction lacquer of the type described above.

The thicknesses of the cross-linked anti-friction lacquer layers in the completed sliding element are advantageously between 1 and 50 μm. In this instance, the thickness, as conventional for sliding elements, is adapted to the component size, that is to say, thicknesses of from 5 to 25 μm are particularly preferred for bearings having diameters up to 130 mm. Below 5 μm, the ability to adapt is lost and above 25 μm the durability of the layer decreases significantly. With large bearings having a diameter of above 130 mm, nonetheless, layer thicknesses of the anti-friction lacquer layers of up to 50 μm are acceptable since therein an increased run-in wear as a result of geometry errors or larger tolerance ranges may be anticipated.

The exposed surface of the metal substrate layer which is provided with the coating preferably has a roughness of $R_z=1$ to 10 μm, in a particularly preferred manner $R_z=$from 3 to 8 μm. In this range, on the one hand, an improved bonding was determined and, on the other hand, the rough surface leads with partial wear of the coating to initially only the tips, that is to say, very small surface portions of the metal substrate layer, becoming exposed, which increases the load-bearing capacity of the surface without simultaneously having the susceptibility to fretting of larger exposed regions of the metal substrate.

The required roughnesses can be produced by mechanical methods, such as sand blasting or grinding, but also chemically by means of phosphating or etching. In addition to the irregular roughnesses, regular substrate structures which can be produced, for instance, by means of drilling, reaming or stamping, are also advantageous.

Blasting with hard particles has been found to be particularly advantageous. It is assumed that, as a result of small particle residues in the surface, an additional improvement of the wear resistance can be achieved when the bearing metal is locally exposed by means of adaptation effects or wear of the lacquer layer caused for other reasons.

The metal substrate layer may itself comprise a single metal layer or may comprise a layered composite of a plurality of functionally different metal layers. The layer of the substrate layer which is exposed in each case and to which the coating of the anti-friction lacquer is applied may therefore be formed from different metals or metal alloys, in particular a Cu, Al, Ni, Sn, Zn, Ag, Au, Bi or Fe alloy.

The metal substrate layer may comprise a steel support layer or a metal bearing metal layer or a steel support layer and a metal bearing metal layer, optionally a metal intermediate layer and optionally a (thin) metal covering or sliding layer. Both the steel support layer and the bearing metal layer may, depending on the required properties, in particular the strength, be present individually or in combination in the substrate layer or form them.

If a sliding layer forms the exposed layer of the substrate layer, the coating of the anti-friction lacquer is preferably formed as a run-in layer for adaptation or conditioning of the counter-movement member, in a radial bearing of the shaft material.

A "run-in layer for conditioning a counter-movement member" in the context of this teaching requires at least one of the following steps: addition of hard materials of at least 0.5% by weight with respect to the cured anti-friction lacquer layer; small addition of cross-linking media of from 1 to 15 mol % in relation to the number of imide groups of the prepolymer. By selecting a small addition of cross-linking medium, there results a comparatively smaller cross-linking degree of the run-in layer, in which a given adaptation wear is certainly desirable.

A "run-in layer for adaptation" in the context of this teaching is also obtained by only a small addition of cross-linking media of from 1 to 15 mol %, in relation to the number of imide groups of the prepolymer and a content of solid lubricants of a total of at least 30% by vol. with at the same time a smaller content of binders, that is to say, proportion of the polymer matrix.

Both run-in layers preferably have a layer thickness of from 1 to 5 μm and may in a particularly advantageous manner be based on highly durable sputtering layers, in particular those based on AlSn. However, the run-in layers are also advantageous on galvanic sliding layers, particularly when the surface of the counter-movement member is particularly aggressive.

If the bearing metal layer forms the exposed metal layer, to which the coating of anti-friction lacquer is applied, the coating of the anti-friction lacquer is preferably formed as an independent sliding layer with a long service-life. A "sliding layer with a long service-life" requires in the context of this teaching at least one of the following steps: addition of cross-linking media of from 3 to 25 mol % in relation to the number of imide groups of the prepolymer; layer thickness between 5 and 25 μm. The service-life layer should last as long as possible. To this end, it requires a degree of wear resistance and adequate thickness. The addition of cross-linking media results in this regard in an improvement and the layer thickness is selected accordingly.

The use of the coating as a sliding layer on CuSn, CuNiSi, CuZn, CuSnZn, AlSn, AlSi, AlSnSi, AlZn bearing metal alloys is advantageous.

According to an advantageous development, the metal substrate layer of the sliding element has an intermediate layer, preferably of Sn, Ni, Ag, Cu, Fe or the alloys thereof on the steel support layer or, if present, on the bearing metal layer, on which intermediate layer either the covering or sliding layer or directly the coating of the anti-friction lacquer is formed. In the latter case, the intermediate layer forms the exposed layer of the substrate layer. In a particularly preferred manner, intermediate layers are of Ni or Ag and the alloys thereof.

The intermediate layer is optional and serves to improve the bonding and/or sliding properties if the coating and, if present, the covering or sliding layer should become completely worn. The intermediate layer may itself be constructed from one or more individual layers, for example, from a combination of an Ni and an NiSn layer.

A particular embodiment of the invention makes provision for the coating to be a multi-layered system of at least two anti-friction lacquers, of which at least one anti-friction lacquer is constructed in accordance with the method described above, wherein the anti-friction lacquers are configured in such a manner that an upper anti-friction lacquer layer is constructed as a run-in layer for conditioning a counter-movement member on a lower anti-friction lacquer layer which is formed as a sliding layer with a long service-life.

An alternative multi-layered system according to this invention is constructed in such a manner that, below an upper anti-friction lacquer layer as a sliding layer with good sliding and adaptation properties, a lower anti-friction lacquer layer as a sliding layer with high wear resistance is formed.

A "sliding layer with good sliding and adaptation properties" in the context of this teaching requires at least one of the following steps: addition of solid lubricants of a total of from 30 to 60% by vol. with respect to the cured anti-friction lacquer layer; addition of cross-linking media of from 1 to 10 mol % in relation to the number of imide groups of the prepolymer; layer thickness between 1 and 10 μm. In this instance, therefore, this firstly involves optimising the sliding properties, that is to say, reducing the friction and increasing the embeddability, to which the mechanical resilience is also adapted.

A "sliding layer with a high wear-resistance" in the context of this teaching requires at least the addition of cross-linking media of from 10 to 25 mol % in relation to the number of imide groups of the prepolymer. Its objective is to further increase the operational reliability of the sliding element or bearing by it being optimised with particular regard to the wear resistance thereof and thus delaying a complete wearing down to the bearing metal. The sliding layer with a high wear resistance is similar to the service-life layer with regard to the cross-linking, but in the latter the thickness thereof, which also determines the service-life, is also an important factor.

Another sliding element having a multi-layered system according to this invention makes provision for the coating to comprise at least two anti-friction lacquers, of which at least one anti-friction lacquer is formed in accordance with the method described above, wherein an additional lower anti-friction lacquer layer which contains few or no additives at all is arranged between the metal substrate and an upper anti-friction lacquer layer which is constructed as a sliding layer with good sliding and adaptation properties or as a sliding layer with a high degree of wear resistance or as a sliding layer with a long service-life.

An "anti-friction lacquer layer which contains few or no additives at all" in the context of this teaching requires the following steps: the proportion of the functional fillers is from 0 to 25% by vol. with respect to the cured anti-friction lacquer. This layer is optimised with respect to bonding to the substrate and has, similarly to a primer, the purpose of improving the bonding of the anti-friction lacquer coating located above. This anti-friction lacquer layer which contains few or no additives at all is additionally preferably thinner than the anti-friction lacquer layer above and in a particularly preferred manner only from 0.5 to 5 μm thick.

Accordingly, the coating of the sliding element is preferably a multi-layered system comprising at least two anti-friction lacquers, of which at least one anti-friction lacquer is constructed in accordance with the method described above, wherein the anti-friction lacquers have different proportions at least with regard to one substance selected from the group comprising bi-functional or cyclised bi-functional compounds, solid lubricants, hard materials and materials which improve the thermal conductivity depending on the application.

In contrast to multi-layered systems with discrete layers of anti-friction lacquer layers, a development of the invention makes provision for a sliding element having a coating comprising a gradient layer system. The gradient layer system comprises at least two anti-friction lacquers, of which at least one anti-friction lacquer is constructed in accordance with the method described above, wherein when viewed over at least a portion of the layer thickness at least one substance selected from the group comprising bi-functional or cyclised bi-functional compounds, solid lubricants, hard materials and materials which improve the thermal conductivity depending on the application has an increasing or decreasing proportion.

In a particularly preferred manner, the above-described sliding elements, formed as a plain bearing shell or bush (as connection rod bearings or crankshaft bearings) are used in an internal combustion engine. The anti-friction lacquer is also suitable for use directly as a coating in the internal combustion engine, for example, for the pistons as a shroud coating, or the piston rings as an anti-microwelding flank coating. The anti-friction lacquer may be used, for example, as a coating by the anti-friction lacquer being applied to a metal substrate layer in order to form one of the above-mentioned sliding elements with a metal substrate layer.

THE DRAWINGS

Other features, advantages and applications will be explained in greater detail below with reference to embodiments and the Figures. In the Figures.

DETAILED DESCRIPTION

All the embodiments have a metal substrate layer 11, 21, 31, 41, 51 and a coating 12, 22, 32, 42, 52 which is applied thereto and which comprises at least one anti-friction lacquer according to the invention, wherein the inner structure of the substrate layer and/or the coating vary. The thickness of the coating is between 1 and 50 μm, wherein the schematic illustrations depict the real layer thickness relationships neither precisely nor in a proportionally correct manner, but instead merely to illustrate the sequence of the layers.

Figure 1:
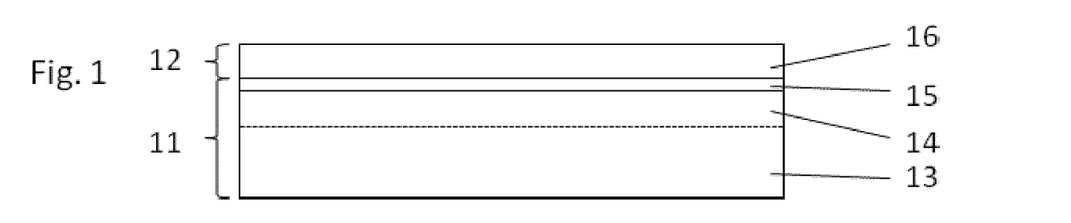
FIG. 1 is a schematic layered structure of a sliding element according to a first embodiment of the invention.

The metal substrate layer 11 of the sliding element according to FIG. 1 has a support layer 13, generally of steel, and a bearing metal 14, in most cases based on a Cu or Al alloy, and an intermediate layer 15, which itself may be constructed from one or more individual layers and which can be used to improve the bonding between the bearing metal layer and the coating 12. Depending on the application, the intermediate layer may also be configured in such a manner that, in the event of wear of the layer above, it has improved sliding or emergency running properties. The coating 12 comprises in this embodiment an individual layer 16 of the anti-friction lacquer according to the invention.

In principle, with adequate strength of the bearing metal in this embodiment and the following embodiments, the support layer of steel can be dispensed with. Also under some application conditions, the bearing metal layer may also be dispensable in principle. The intermediate layer is also optional, as some of the following embodiments show.

Figure 2:
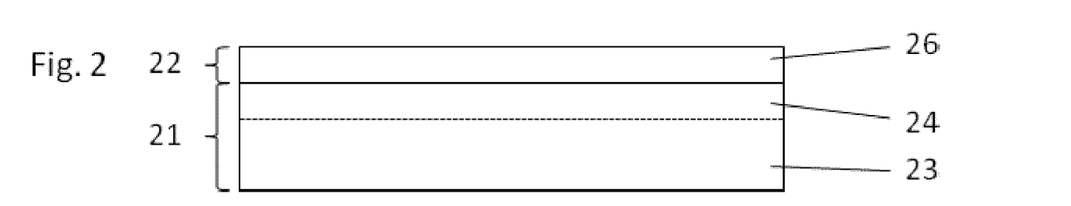
FIG. 2 is a schematic layered structure of a sliding element according to a second embodiment of the invention.

In FIG. 2, the metal substrate layer 21 of the sliding element again comprises a steel support layer 23 and a bearing metal layer 24 to which the coating 22 is applied, this time without an intermediate layer, again in the form of an individual layer 26 of the anti-friction lacquer according to the invention.

Figure 3:
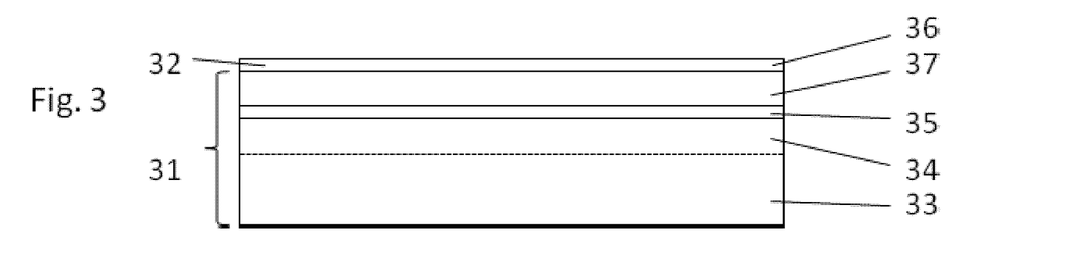
FIG. 3 is a schematic layered structure of a sliding element according to a third embodiment of the invention.

The embodiment according to FIG. 3 has a metal substrate layer 31, which comprises a steel support layer 33, a bearing metal layer 34, an intermediate layer 35 and a thin metal sliding or covering layer 37 which is applied thereto. The sliding or covering layer 37 is sputtered on the intermediate layer 35 or galvanically deposited at that location. In this instance, the intermediate layer 35 serves to improve the bonding of the metal sliding or covering layer 37 to the bearing metal layer 34. The coating 32 is applied in the form of an individual layer 36 of the anti-friction lacquer according to the invention to the sliding layer 37 and acts as a run-in layer. It is possible to use as a run-in layer both a lacquer composition which is optimised for conditioning the counter-movement member and a lacquer composition which is optimised in terms of adaptation.

Figure 4:
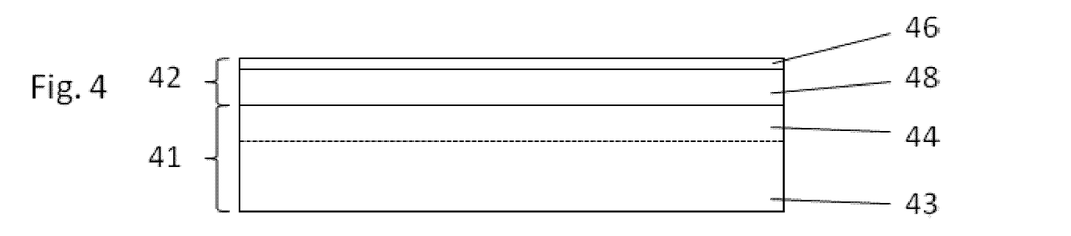
FIG. 4 is a schematic layered structure of a sliding element according to a fourth embodiment of the invention and FIG. 5 is a schematic layered structure of a sliding element according to a fifth embodiment of the invention.

FIG. 4 shows an embodiment having a metal substrate layer 41 which comprises a steel support layer 43 and a bearing metal layer 44. There is arranged thereon the coating 42 in the form of a multi-layered system comprising at least two anti-friction lacquers, of which at least one anti-friction lacquer is constructed according to the invention. The coating 42 specifically has an upper anti-friction lacquer layer 46 which is constructed as a run-in layer and below this an anti-friction lacquer layer 48 which is in contact with the metal substrate 41 and which is constructed as a sliding layer with a long service-life. The service-life anti-friction lacquer layer 48 comprises the cross-linked anti-friction lacquer according to the invention, the run-in layer 46 which is applied thereto comprises cross-linked or non-cross-linked lacquer. It is also possible to use here as a run-in layer a lacquer composition which is optimised for the conditioning of the counter-movement member, or a lacquer composition which is optimised with regard to the adaptation.

Figure 5:
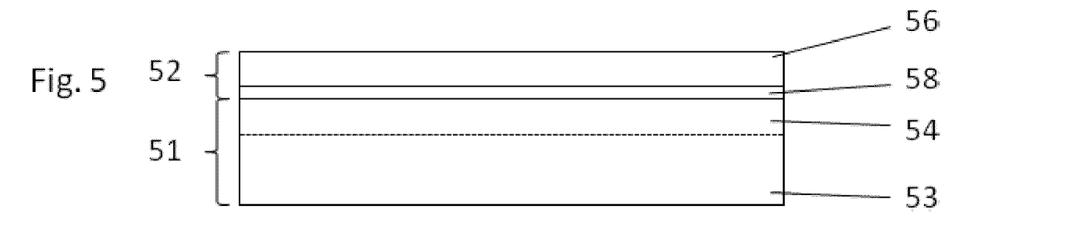

Finally, FIG. 5 shows an embodiment having a metal substrate layer 51 which comprises a steel support layer 53 and a bearing metal layer 54. There is arranged thereon the coating 52 in the form of a multi-layered system comprising at least two anti-friction lacquers, of which at least one anti-friction lacquer is constructed according to the invention. The coating 52 has on the metal substrate 51 a lower anti-friction lacquer layer 58 and on top of this an upper anti-friction lacquer layer 56. The upper anti-friction lacquer layer 56 forms a sliding layer with good sliding and adaptation properties or a sliding layer with a long service-life. The lower anti-friction lacquer layer is optimised in terms of the bonding to the substrate and has, similarly to a primer, the purpose of improving the bonding of the anti-friction lacquer layer located above.

Examples

All the embodiments mentioned below were produced in the same manner:

Use of PAI prepolymer in N-ethyl-2-pyrrolidone (NEP), mixing of the components by means of a dissolver and a bead mill until complete homogenisation and a particle fineness of 5 μm, established by means of a grindometer measurement, pretreatment of the substrate materials by washing, degreasing and blasting with corundum, application to the substrate materials with the spraying method, drying, curing at 260° C. for 20 minutes. In the case of tin-containing aluminium materials as the substrate, the curing temperature was reduced to 200° C. and the curing time was increased to 40 minutes. These processes and process conditions were selected to be the same for all the tests for the purpose of being able to compare the results. However, the invention is not limited to production in this manner.

Table 1 compares the examples 1 to 7 of sliding elements with the anti-friction lacquer according to the invention and a comparison example R1, in which the anti-friction lacquer does not contain any added cross-linking agent. All the sliding elements have a metal substrate layer based on a CuNiSi alloy, to which the anti-friction lacquer layer has been applied at a thickness of 10 μm. In all the anti-friction lacquers, 30% by vol. of the soft phase $MoS_2$ is contained in the same manner as the only filler. The resin matrix of the anti-friction lacquer is in all cases PAI, to which in all cases there was added, with the exception of the comparison example, 10 mol % of a cross-linking agent in relation to the imide groups of the PAI prepolymer. Only the cross-linking agent was therefore varied.

There was measured the so-called Underwood (UW) durability, whereby the maximum loading is intended to be understood, in which the anti-friction lacquer layer withstands a 250 hour Underwood test without any damage. In the Underwood test carried out here, the bearing loading was achieved by a shaft speed of 4000 rpm, wherein the shaft had a diameter of 50 mm and was provided with eccentric weights which produced a cyclical force. The specific loading was adjusted via the bearing width. In all exemplary elements 1 to 7, a significant increase of the Underwood durability can be established in comparison with the sliding element R1 without any cross-linking agent. The best results were obtained with the cross-linking agents Bernstein acid and succinimide.

Furthermore, the fretting index was measured, by which there is intended to be understood the mean running time in hours which is achieved in a test in a one-cylinder test stand driven via a shaft without compression at 6700 rpm and with deficient lubrication until fretting. The test duration is a maximum of 35 hours, the shaft and bearing inner diameter was also 50 mm here. The shaft was made of steel. An increase of the fretting index may also be clearly indicated here with the addition of the cross-linking agent. In this case, the cross-linking agents Bernstein acid, caprolactam and Bernstein acid anhydride obtained the best results.

Table 2 compares the examples 8 to 12 and two references R2 and R3 with each other which have the anti-friction lacquer according to the invention with added bi-functional compounds as the cross-linking agents. All the sliding elements have the same metal substrate layer as the examples 1 to 7 above. The anti-friction lacquer layer is also again applied thereto at a thickness of 10 μm in the same manner. Also in an unchanged state, 30% by vol. of the soft phase $MoS_2$ is contained in all the anti-friction lacquers as the only filler. Furthermore, in all the examples 8 to 12 and also in the references R2 and R3, the same cross-linking agent Bernstein acid was also used, though in different concentrations. The resin matrix of the anti-friction lacquer is again PAI in all cases. The Underwood durability and the fretting index were again measured in the same manner.

It is possible to establish that, at a cross-linking quantity of from 1 mol % to at least 34 mol % in relation to the imide groups of the PAI prepolymer, there is produced an improvement of at least one of the two measured parameters and consequently of the properties of durability and fretting resistance, cf. Examples 8-12 with the comparison example R1 in Table 1. The maximum improvement in the total of both properties was able to be established at 15 mol % of Bernstein acid in relation to the imide groups of the PAI prepolymer, wherein the improvement is significant at the same time in a wide range from 5 to 25 mol %. However, no change of the properties could yet be established at 0.5 mol % in relation to the imide groups of the PAI prepolymer, cf. reference R2, and at 37 mol % there was even a worsening of both properties again, cf. reference R3.

Table 3 compares different examples 13 to 22 of sliding elements with a variation of the resin matrix of the anti-friction lacquer, the copper alloy of the metal substrate layer, the cross-linking agents in the anti-friction lacquer, the cross-linking content, the solid lubricants in the anti-friction lacquer, the hard materials and other additives in the anti-friction lacquer and the layer thickness of the anti-friction lacquer layer with a comparison example of the sliding element without any cross-linking agents but with an otherwise identical structure. The common aspect to all the examples is only that the substrate material is based on a copper matrix. The comparison examples have the designations R13 to R22, wherein the numbers indicate the association with the embodiment according to the invention having the same numbering. The Underwood durability and the fretting index were also measured here in the same manner.

It has been found that, as a result of the addition of cross-linking agent, irrespective of the variable parameters in principle an improvement of the loading and fretting resistance can be obtained. In individual cases, the fretting resistance even improves by more than three times and the durability improves by 35% with respect to the corresponding comparison example.

Table 4, similarly to Table 3, compares different examples 23 to 27 of sliding elements with a variation of the resin matrix of the anti-friction lacquer, the aluminium alloy of the metal substrate layer, the cross-linking agents in the anti-friction lacquer, the cross-linking content, the solid lubricants in the anti-friction lacquer, the hard materials and other additives in the anti-friction lacquer and the layer thickness of the anti-friction lacquer layer with a comparison example of the sliding element without any cross-linking agents but with an otherwise identical structure. The common aspect to all the examples is that the substrate material is based on an aluminium matrix, which differentiates it at the same time from the examples in Table 3. The comparison examples have the designations R23 to R27, wherein the numbers also indicate here the association with the embodiment according to the invention having the same numbering. The Underwood durability and the fretting index were also measured here in the same manner.

It has again been found that, as a result of the addition of cross-linking agent, irrespective of the variable parameters an improvement of the loading and/or fretting resistance can be obtained even though not to the significant extent of the copper-based substrate materials. This is because, on the one hand, the aluminium materials in principle have a lower basic strength than the copper materials, which can be compensated for only to a limited degree by the anti-friction lacquer layer. On the other hand, the fretting index in the aluminium-based substrate materials is already so high in the comparison configuration that in most examples the maximum test duration was exceeded so that in these cases no statement can be made in relation to an improvement of the property. The substantially better emergency running properties of the aluminium layer can be made responsible for this and are superimposed on the property measurement of the anti-friction lacquer layer.

Table 5 relates to examples 28 to 30 and corresponding counter-examples R28 to R30 without any cross-linking agents, but with an otherwise identical structure, in which a metal intermediate layer which is galvanically applied to the bearing metal layer comprising CuSn8Ni and which comprises Ni, Ni/SnNi or Ag forms the metal substrate layer, on which the coating of the anti-friction lacquer is preferably formed as a sliding layer with a high service-life. Both the resin matrix PAI and the cross-linking agent Bernstein acid of the anti-friction lacquer are the same in all the examples according to the invention. However, the sliding elements vary in terms of the composition and the thickness of the intermediate layer, the cross-linking agent content, the type and quantity of the functional fillers added to the anti-friction lacquer and the layer thickness of the anti-friction lacquer layer. The Underwood durability and the fretting index were also measured here in the same manner.

Although the combinations with a metal intermediate layer already provide very good Underwood load values without cross-linking, an improvement of the durability and particularly the fretting resistance can also be identified again here as a result of the cross-linking agent addition in all cases.

The embodiments 31 to 33 in Table 6 relate to sliding elements, in which the metal substrate layer is constructed functionally as a thin, galvanically applied sliding or covering layer, on which the coating of the anti-friction lacquer is constructed as an additional run-in layer in order to adapt or condition the counter-movement member. Two references are set out for each of the embodiments for comparison. The first references R31, R32 and R33 do not have any polymer run-in layer on the galvanic layer. The second references R31A, R32A and R33A have a polymer run-in layer on the galvanic layer but without any cross-linking agent. Three different galvanic layers are used but are all of the same thickness. Both the resin matrix PAI and the cross-linking agent, oxalic acid of the anti-friction lacquer, are the same in all the examples according to the invention. However, the sliding elements vary in terms of the cross-linking agent content, the type and quantity of the functional fillers added to the anti-friction lacquer and the layer thickness of the anti-friction lacquer layer.

The Underwood durability and the fretting index were also measured here in the same manner. Whereas, in all the examples above, only one steel shaft was used during the fretting test, the examples from Table 6 were tested with two different shaft materials, once with a steel shaft and once with a cast shaft.

The maximum Underwood load already increased in all exemplary cases with the use of a conventional anti-friction lacquer with respect to the bearings without any such anti-friction lacquer. More significant and consistent for all the examples is again the increase of the durability as a result of the use of the additional cross-linking agent according to the invention.

With respect to the fretting index, it may initially be established that in particular in the coarser cast shafts a conditioning as a result of hard particles in the anti-friction lacquer brings about a significant improvement, as the examples 31 and 33 show in comparison with the respective counter-examples R31 and R33. The addition of the cross-linking agent to the anti-friction lacquer brings about no deterioration in this regard. In steel shafts (32), an improvement may be explained instead by an accelerated adaptation at a higher content of lubricant and without any hard particles. In this case, a deterioration of the fretting behaviour may also occur with additional use of cross-linking agent if the increased wear resistance delays the adaptation. Often, however, this can be compensated for by an adaptation of the composition. With regard to the requirements in the specific application, a weighting and overall consideration of the profile of the properties would be necessary here.

Table 7 shows three additional embodiments 34 to 36 of sliding bearing elements according to the invention, in which the coating is a multi-layered system comprising at least two anti-friction lacquers, of which an upper anti-friction lacquer layer is constructed as a sliding layer with good sliding and adaptation properties and a lower anti-friction lacquer layer is constructed as a sliding layer with high wear resistance. A common aspect of the examples is the substrate material (CuNi2Si), the resin matrix of the anti-friction lacquer of both anti-friction lacquer layers (PAI) and the cross-linking agent in the anti-friction lacquer (Bernstein acid). The cross-linking agent contents both in the lower layer and in the upper layer are variable, wherein example 34 does not contain any cross-linking agent at all in the upper layer. The functional fillers in the anti-friction lacquers and the contents thereof are further variable, as are the layer thicknesses of both anti-friction lacquer layers.

It is found that in any case in the context established here of the compositions very good durability values and fretting indices are always achieved.

Table 8 shows two additional embodiments 37 and 38 of sliding bearing elements according to the invention, in which the coating is a multi-layered system comprising at least two anti-friction lacquers, of which an upper anti-friction lacquer layer is constructed as a run-in layer for conditioning a counter-movement member and a lower anti-friction lacquer layer is constructed as a sliding layer with a long service-life. A common aspect of the examples is again the substrate material (CuNi2Si) and the resin matrix of the anti-friction lacquer of both anti-friction lacquer layers (PAI). The cross-linking agents in the anti-friction lacquer and the contents thereof both in the lower layer and in the upper layer, the functional fillers in the anti-friction lacquers and the contents thereof and the layer thicknesses of both anti-friction lacquer layers are variable.

It is also found here and in comparison with the examples from Table 7 that very good durability values and fretting indices are less dependent on the variable parameters if cross-linking agent is present only generally sufficiently in at least one of the anti-friction lacquer layers and preferably in the sliding layer with a high service-life or the sliding layer with a high level of wear resistance.

Table 9: Examples of (lower) layers for improving adhesion or as a wear retardant Table 9 contains two additional embodiments 39 and 40 of sliding bearing elements according to the invention, in which the coating is a multi-layered system comprising at least two anti-friction lacquers. By way of a variant, here the service-life layers with a higher capacity for adaptation than upper layers were combined with thinner lower layers which are configured as a wear retardant with a lower lubricant proportion and hard particles. As a result of these intermediate layers, it is possible generally to achieve an improved fretting behaviour with complete wear of the upper layers in comparison with service-life layers which are coated directly on the substrate. This can be seen, for example, in a comparison of example 40 with example 6.

TABLE 1

| No. | Substrate | Matrix polymer | Cross-linking agent | Content (mol %) | Solid lubricant | Layer thickness [μm] | Max. Underwood load [MPa] | Fretting index |
|---|---|---|---|---|---|---|---|---|
| R1 | CuNi2Si | PAI | None |  | 30% by vol. MoS$_2$ | 10 | 85 | 12 |
| 1 | CuNi2Si | PAI | Oxalic acid | 10 | 30% by vol. MoS$_2$ | 10 | 95 | 24 |
| 2 | CuNi2Si | PAI | Bernstein acid | 10 | 30% by vol. MoS$_2$ | 10 | 105 | 25 |
| 3 | CuNi2Si | PAI | Caprolactam | 10 | 30% by vol. MoS$_2$ | 10 | 100 | 25 |
| 4 | CuNi2Si | PAI | Pentanediol | 10 | 30% by vol. MoS$_2$ | 10 | 95 | 18 |
| 5 | CuNi2Si | PAI | Succinimide | 10 | 30% by vol. MoS$_2$ | 10 | 105 | 22 |
| 6 | CuNi2Si | PAI | Caprolactone | 10 | 30% by vol. MoS$_2$ | 10 | 95 | 15 |
| 7 | CuNi2Si | PAI | Bernstein acid anhydride | 10 | 30% by vol. MoS$_2$ | 10 | 100 | 25 |

TABLE 2

| No. | Substrate | Matrix polymer | Cross-linking agent | Content (mol %) | Solid lubricant | Layer thickness [μm] | Max. Underwood load [MPa] | Fretting index |
|---|---|---|---|---|---|---|---|---|
| R2 | CuNi2Si | PAI | Bernstein acid | 0.5 | 30% by vol. $MoS_2$ | 10 | 85 | 12 |
| R3 | CuNi2Si | PAI | Bernstein acid | 37 | 30% by vol. $MoS_2$ | 10 | 80 | 8 |
| 8 | CuNi2Si | PAI | Bernstein acid | 1 | 30% by vol. $MoS_2$ | 10 | 90 | 13 |
| 9 | CuNi2Si | PAI | Bernstein acid | 5 | 30% by vol. $MoS_2$ | 10 | 100 | 21 |
| 10 | CuNi2Si | PAI | Bernstein acid | 15 | 30% by vol. $MoS_2$ | 10 | 110 | 35 |
| 11 | CuNi2Si | PAI | Bernstein acid | 25 | 30% by vol. $MoS_2$ | 10 | 105 | 35 |
| 12 | CuNi2Si | PAI | Bernstein acid | 34 | 30% by vol. $MoS_2$ | 10 | 90 | 9 |

TABLE 3

| No. | Substrate | Matrix polymer | Cross-linking agent | Content (mol %) | Solid lubricant [% by vol.] | Mechanically resistant material [% by vol.] | Others [% by vol.] | Layer thickness [μm] | Max. Underwood load [MPa] | Fretting index |
|---|---|---|---|---|---|---|---|---|---|---|
| R13 | CuNi2Si | PAI | | 0 | 15 h-BN/ 15 $MoS_2$ | 5 SiC | | 8 | 85 | 7 |
| 13 | CuNi2Si | PAI | Bernstein acid | 15 | 15 h-BN/ 15 $MoS_2$ | 5 SiC | | 8 | 115 | 25 |
| R14 | CuNi2Si | PAI | | 0 | 35 h-BN | 3 SiC | 6 $Fe_2O_3$ | 8 | 105 | 12 |
| 14 | CuNi2Si | PAI | Bernstein acid | 15 | 35 h-BN | 3 SiC | 6 $Fe_2O_3$ | 8 | 120 | 35 |
| R15 | CuNi2Si | PAI | | 0 | 20 $MoS_2$ | | | 10 | 85 | 8 |
| 15 | CuNi2Si | PAI | Succinimide | 20 | 20 $MoS_2$ | | | 10 | 100 | 22 |
| R16 | CuNi2Si | PAI | | 0 | 23 $WS_2$ | | | 12 | 90 | 11 |
| 16 | CuNi2Si | PAI | Caprolactam | 25 | 23 $WS_2$ | | | 12 | 105 | 23 |
| R17 | CuNi2Si | PAI | | 0 | 17 graphite | | 3 $(NiSbTi)O_2$ | 12 | 90 | 9 |
| 17 | CuNi2Si | PAI | Succinimide | 10 | 17 graphite | | 3 $(NiSbTi)O_2$ | 12 | 95 | 21 |
| R18 | CuNi2Si | PAI | | 0 | 30 PTFE | | | 9 | 80 | 18 |
| 18 | CuNi2Si | PAI | Bernstein acid | 20 | 30 PTFE | | | 9 | 100 | 35 |
| R19 | CuNi2Si | PI | | 0 | 35 h-BN | | | 7 | 90 | 12 |
| 19 | CuNi2Si | PI | Caprolactam | 10 | 35 h-BN | | | 7 | 105 | 28 |
| R20 | CuSn10Bi3 | PAI | | 0 | 20 $MoS_2$ | 5 $Si_3N_4$ | 3 $Fe_2O_3$ | 10 | 85 | 18 |
| 20 | CuSn10Bi3 | PAI | Bernstein acid | 5 | 20 $MoS_2$ | 5 $Si_3N_4$ | 3 $Fe_2O_3$ | 10 | 105 | 35 |
| R21 | CuSn10Bi3 | PEI | | 0 | 20 $WS_2$ | 3 SiC | | 14 | 80 | 16 |
| 21 | CuSn10Bi3 | PEI | Bernstein acid | 30 | 20 $WS_2$ | 3 SiC | | 14 | 95 | 29 |
| R22 | CuNi2Si | PAI | | 0 | 20 $MoS_2$ | | 15 Sn | 14 | 85 | 11 |
| 22 | CuNi2Si | PAI | Succinimide | 10 | 20 $MoS_2$ | | 15 Sn | 14 | 100 | 24 |

TABLE 4

| No. | Substrate | Matrix polymer | Cross-linking agent | Content (mol %) | Solid lubricant [% by vol.] | Mechanically resistant material [% by vol.] | Others [% by vol.] | Layer thickness [μm] | Max. Underwood load [MPa] | Fretting index |
|---|---|---|---|---|---|---|---|---|---|---|
| R23 | AlSn10Ni2MnCu | PAI | | | 25 h-BN | | | 12 | 80 | 35 |
| 23 | AlSn10Ni2MnCu | PAI | Bernstein acid | 20 | 25 h-BN | | | 12 | 90 | 35 |
| R24 | AlSn10Ni2MnCu | PEI | | | 30 $MoS_2$ | | 3 $Fe_2O_3$ | 9 | 80 | 35 |
| 24 | AlSn10Ni2MnCu | PEI | Bernstein acid | 15 | 30 $MoS_2$ | | 3 $Fe_2O_3$ | 9 | 95 | 35 |
| R25 | AlNi2MnCu | PAI | | | 45 $WS_2$ | 5 SiC | | 10 | 85 | 22 |
| 25 | AlNi2MnCu | PAI | Succinimide | 10 | 45 $WS_2$ | 5 SiC | | 10 | 95 | 30 |
| R26 | AlNi2MnCu | PI | | | 40 $MoS_2$ | | 5 $Fe_2O_3$ | 10 | 80 | 19 |
| 26 | AlNi2MnCu | PI | Bernstein acid | 15 | 40 $MoS_2$ | | 5 $Fe_2O_3$ | 10 | 95 | 27 |
| R27 | AlSn6Si4CuMnCr | PAI | | | 25 h-BN | | 7 Ag | 13 | 75 | 35 |
| 27 | AlSn6Si4CuMnCr | PAI | Caprolactam | 25 | 25 h-BN | | 7 Ag | 13 | 85 | 35 |

TABLE 5

| No. | Substrate | Intermediate layer | Thickness [μm] | Matrix polymer | Cross-linking agent | Content (mol %) | Solid lubricant [% by vol.] | Mechanically resistant material [% by vol.] | Others [% by vol.] | Thickness [μm] | Max. Underwood load [MPa] | Fretting index |
|---|---|---|---|---|---|---|---|---|---|---|---|---|
| R28 | CuSn8Ni | Ni | 5 | PAI | | 0 | 30 WS$_2$ | 3 Si$_3$N$_4$ | 3 Fe$_2$O$_3$ | 9 | 105 | 9 |
| 28 | CuSn8Ni | Ni | 5 | PAI | Bernstein acid | 15 | 30 WS$_2$ | 3 Si$_3$N$_4$ | 3 Fe$_2$O$_3$ | 9 | 120 | 26 |
| R29 | CuSn8Ni | Ni/SnNi | 7 | PAI | | 0 | 35 MoS$_2$ | 5 SiC | | 8 | 100 | 9 |
| 29 | CuSn8Ni | Ni/SnNi | 7 | PAI | Bernstein acid | 20 | 35 MoS$_2$ | 5 SiC | | 8 | 115 | 28 |
| R30 | CuSn8Ni | Ag | 4 | PAI | | 0 | 30 h-BN | | 5 Fe$_2$O$_3$ | 12 | 100 | 19 |
| 30 | CuSn8Ni | Ag | 4 | PAI | Bernstein acid | 25 | 30 h-BN | | 5 Fe$_2$O$_3$ | 12 | 115 | 35 |

TABLE 6

| No. | Substrate | Sliding layer | Matrix polymer | Cross-linking agent | Content (mol %) | Solid lubricant [% by vol.] | Mechanically resistant material [% by vol.] | Others [% by vol.] | Thickness [μm] | Max. Underwood load [MPa] | Fretting index (steel) | Fretting index (casting) |
|---|---|---|---|---|---|---|---|---|---|---|---|---|
| R31 | CuSn8Ni | Ni/SnCu6 | | | | | | | | 80 | 7 | 4 |
| R31A | CuSn8Ni | Ni/SnCu6 | PAI | | | 40 MoS$_2$ | 7 SiC | 3 Fe$_2$O$_3$ | 3 | 90 | 15 | 35 |
| 31 | CuSn8Ni | Ni/SnCu6 | PAI | Oxalic acid | 22 | 40 MoS$_2$ | 7 SiC | 3 Fe$_2$O$_3$ | 3 | 100 | 7 | 35 |
| R32 | CuSn8Ni | Ni/SnNi/SnCu6 | | | | | | | | 85 | 8 | 4 |
| R32A | CuSn8Ni | Ni/SnNi/SnCu6 | PAI | | | 25 h-BN/25 MoS$_2$ | | 3 Fe$_2$O$_3$ | 5 | 90 | 35 | 4 |
| 32 | CuSn8Ni | Ni/SnNi/SnCu6 | PAI | Oxalic acid | 10 | 25 h-BN/25 MoS$_2$ | | 3 Fe$_2$O$_3$ | 5 | 105 | 35 | 4 |
| R33 | CuSn8Ni | Ag/Bi | | | | | | | | 80 | 22 | 3 |
| R33A | CuSn8Ni | Ag/Bi | PAI | | | 35 WS$_2$ | 5 Si$_3$N$_4$ | | 3 | 85 | 17 | 35 |
| 33 | CuSn8Ni | Ag/Bi | PAI | Oxalic acid | 23 | 35 WS$_2$ | 5 Si$_3$N$_4$ | | 3 | 100 | 17 | 35 |

TABLE 7

| No. | Substrate | Matrix polymer | Lower layer [% by vol.] | Lower cross-linking agent [mol %] | Thickness [μm] | Upper layer [% by vol.] | Upper cross-linking agent [mol %] | Thickness [μm] | Max. Underwood load [MPa] | Fretting index |
|---|---|---|---|---|---|---|---|---|---|---|
| 34 | CuNi2Si | PAI | 35 h-BN, 8 Fe$_2$O$_3$ | 30 Bernstein acid | 11 | 45 h-BN, 3 Fe$_2$O$_3$ | 0 | 5 | 115 | 35 |
| 35 | CuNi2Si | PAI | 40 MoS$_2$, 5 (NiSbTi)O$_2$ | 25 Bernstein acid | 11 | 50 MoS$_2$, 5 Fe$_2$O$_3$ | 3 Bernstein acid | 4 | 115 | 35 |
| 36 | CuNi2Si | PAI | 40 WS$_2$, 5iC | 20 Bernstein acid | 8 | 50 h-BN, 3 Fe$_2$O$_3$ | 5 Bernstein acid | 5 | 110 | 35 |

TABLE 8

| No. | Substrate | Matrix polymer | Lower layer [% by vol.] | Lower cross-linking agent [mol %] | Thickness [μm] | Upper layer [% by vol.] | Upper cross-linking agent [mol %] | Thickness [μm] | Max. Underwood load [MPa] | Fretting index |
|---|---|---|---|---|---|---|---|---|---|---|
| 37 | CuNi2Si | PAI | 30 h-BN, 10 MoS$_2$, 8 Fe$_2$O$_3$ | 20 caprolactam | 12 | 40 MoS$_2$, 7 SiC, 3 Fe$_2$O$_3$ | 30 caprolactam | 4 | 120 | 35 |
| 38 | CuNi2Si | PAI | 30 MoS$_2$, 10 PTFE, 5 (NiSbTi)O$_2$ | 23 oxalic acid | 10 | 35 WS$_2$, 5 Si$_3$N$_4$ | 13 oxalic acid | 3 | 110 | 35 |

TABLE 9

| No. | Substrate | Matrix polymer | Lower layer [% by vol.] | Lower cross-linking agent [mol %] | Thickness [μm] | Upper layer [% by vol.] | Upper cross-linking agent [mol %] | Thickness [μm] | Max. Underwood load [MPa] | Fretting index |
|---|---|---|---|---|---|---|---|---|---|---|
| 39 | CuNi2Si | PAI | 15 MoS$_2$, 10 Fe$_2$O$_3$, 5 SiC | 30 oxalic acid | 4 | 35 MoS$_2$, 5 graphite | 15 pentane diol | 10 | 105 | 22 |
| 40 | CuNi2Si | PAI | 10 h-BN, 5 graphite, 6 (NiSbTi)O$_2$, 6 Si$_3$N$_4$ | 30 Bernstein acid anhydride | 3 | 30 MoS$_2$ | 15 caprolactone | 12 | 100 | 20 |

The invention claimed is:

1. A method for producing an anti-friction lacquer on the basis of an imide polymer as a resin matrix of the lacquer comprising: adding bi-functional or cyclized bi-functional compounds to one of a selected non-imidised or partially imidised polyamide acid prepolymer or an imidised, short-chained blocked prepolymer in a solvent or solvent admixture, wherein the solvent or solvent admixture contains polar, aprotic solvents; and subsequently, in accordance with the selected prepolymer, carrying out a polymerization or an imidisation reaction and in either case a cross-linking reaction to produce the lacquer, wherein the bifunctional or cyclised bifunctional compounds crosslink the non-imidised or partially imidised polyamide acid prepolymer or the imidised, short-chained blocked prepolymer.

2. The method according to claim 1, including selecting a quantity of the bi-functional or cyclized bi-functional compounds to be at least 1 mol % in relation to the number of potential imide groups of the polyamide acid prepolymer or in relation to the number of present imide groups of the short-chained blocked prepolymer, and/or in that the quantity of the added bi-functional or cyclized bi-functional compounds is at a maximum 35 mol % in relation to the number of potential imide groups of the polyamide acid prepolymer or in relation to the number of present imide groups of the short-chained blocked prepolymer.

3. The method according to claim 2, wherein the quantity of the bi-functional or cyclized bi-functional compounds ranges from 3 to 25 mol % in relation to the number of potential imide groups of the amide acid prepolymer or in relation to the number of present imide groups of the short-chained blocked prepolymer.

4. The method according to claim 1, wherein the polyamide acid prepolymer or the short-chained blocked prepolymer is selected from the group of prepolymers for producing polyimides (PI), polyamideimides (PAI), polyether imides (PEI) and polyester imides.

5. The method according to claim 1, wherein the bi-functional or cyclized bi-functional compounds are selected from aromatic or aliphatic or aromatic-aliphatic compounds of the group comprising diamines, diamides, dicarboxylic acids, amino acids, lactams, lactones, imides, anhydrides, acid halides, dialcohols and hydroxyl carboxylic acids.

6. The method according to claim 5, wherein the bi-functional or cyclized bi-functional compounds have chain lengths less than 8 C atoms.

7. The method according to claim 1, wherein the solvent or solvent admixture includes at least one of NMP, NEP or additional homologue substances, DMSO, GBL, DMF, DMAC, DMEU, DMPU, MI, and MEK.

8. An anti-friction lacquer comprising an imide polymer as a resin matrix and functional fillers wherein the molecules of the imide polymer have residues of bi-functional or cyclized bi-functional compounds contributing to the cross-linking.

9. The anti-friction lacquer according to claim 8 wherein the proportion of the functional fillers does not exceed 75% by vol. in relation to the cured anti-friction lacquer and in that the functional fillers contain one or more of the substances solid lubricants, hard material and substances which improve the thermal conductivity.

10. The anti-friction lacquer according to claim 9, wherein the solid lubricants contain one or more of the substances metal sulphides with a layered structure comprising MoS$_2$, WS$_2$, SnS$_2$, graphite, hexagonal BN, polytetrafluoroethylene (PTFE), ZnS, BaSo$_4$ and admixtures thereof.

11. The anti-friction lacquer according to claim 10, wherein the hard materials contain, in a proportion not greater than 10% by vol. in relation to the cured anti-friction lacquer, one or more of the substances nitrides, carbides, borides, oxides.

12. The anti-friction lacquer according to claim 10, wherein the materials which improve the thermal conductivity contain, in a proportion not greater than 30% by vol. in relation to the cured anti-friction lacquer, one or more metal powders from the group comprising Ag, Pb, Au, Sn, Al, Bi or Cu.

13. The anti-friction lacquer according to claim 8, wherein the functional fillers contain iron (III) oxide or NiSbTi mixed-phase oxide at a quantity up to 15% by vol. in relation to the cured anti-friction lacquer.

14. A sliding element comprising: a metal substrate layer and a coating applied thereto of at least one anti-friction lacquer comprising;
an imide polymer as a resin matrix and functional fillers wherein the molecules of the imide polymer have residues of bi-functional or cyclized bi-functional compounds contributing to the cross-linking, wherein the metal substrate layer comprises a steel support layer of a metal bearing metal layer, wherein the coating is applied to an exposed layer of the substrate layer, the exposed layer of the substrate layer preferably being formed from a Cu, Al, Ni, Sn, Zn, Ag, Au, Bi or Fe alloy.

15. The sliding element according to claim 14, including a sliding layer forming the exposed layer of the substrate layer, on which the coating is constructed as a run-in layer for conditioning a counter-movement member or as a run-in layer for adaptation, the sliding layer optionally being constructed as a sputter layer or as a galvanic sliding layer.

16. The sliding element according to claim 14, including a bearing metal layer forming the exposed layer of the substrate layer, on which the coating is constructed as a sliding layer with a long service-life.

17. The sliding element according to claim 14, including an intermediate layer of Sn, Ni, Ag, Cu, Fe or the alloys thereof forming the exposed layer of the substrate layer on which the coating is constructed.

18. The sliding element according to claim 14, wherein the coating is a multi-layered system of at least two anti-friction lacquers, including an upper anti-friction lacquer layer constructed as a run-in layer for conditioning a counter-movement member on a lower anti-friction lacquer layer as a sliding layer with a long service-life or the upper anti-friction lacquer layer is a sliding layer with good sliding and adaptation properties applied to a lower anti-friction lacquer layer which has a high level of wear resistance.

19. The sliding element according to claim 14, wherein the coating is a multi-layered system comprising at least two anti-friction lacquers including an upper anti-friction layer, of which at least one of the anti-friction lacquer layers is constructed according to claim 14, wherein the upper anti-friction lacquer layer which is constructed as a sliding layer with good sliding and adaptation properties or as a sliding layer which has a high level of wear resistance, and wherein between the anti-friction layer and the metal substrate layer there is provided an additional anti-friction lacquer layer which has few or no additives.

20. The sliding element according to claim 14, wherein the coating is a multi-layered system comprising at least two anti-friction lacquers, of which at least of e of the anti-friction lacquers is constructed according to claim 14, wherein the at least two anti-friction lacquers have different proportions at least with respect to a substance selected form the group comprising bi-functional or cyclized bi-functional compounds, solid lubricants, hard materials and materials which improve the thermal conductivity or in that the coating is a gradient layer system comprising at least two anti-friction lacquers, of which at least one anti-friction lacquer is constructed according to claim 8, wherein the gradient layer system when viewed over at least a portion of the layer thickness has at least one substance selected form the group comprising bi-functional or cyclized bi-functional compounds, solid lubricants, hard materials and materials which improve the thermal conductivity in an increasing or decreasing proportion.

21. The method of claim 1 including adding fillers to the matrix.

22. The method according to claim 3, wherein the range is 5 to 20 mol %.

23. The method according to claim 6, wherein the lengths are less than 5c atoms.

24. The anti-friction lacquer of claim 13, wherein the vol % is 1 to 10.

25. The sliding element according to claim 14, including a metal intermediate layer.

26. The sliding element according to claim 14, including a sliding layer.

27. The anti-friction lacquer according to claim 11, wherein the hard materials contain at least one of SiC, $Si_3N_4$, $B_4C_3$, cubic BN and $SiO_2$.

* * * * *